(12) United States Patent
Perrin et al.

(10) Patent No.: US 8,029,040 B2
(45) Date of Patent: Oct. 4, 2011

(54) VEHICLE COMPRISING A WINDOW LINED WITH A SAFETY FILM, AND PRODUCTION METHOD

(75) Inventors: Vincent Perrin, Sermaise (FR); Eric Rouffignac, Saint-Martin-de-nigelles (FR)

(73) Assignee: Renault S.A.S., Boulogne Billancourt (FR)

( * ) Notice: Subject to any disclaimer, the term of this patent is extended or adjusted under 35 U.S.C. 154(b) by 545 days.

(21) Appl. No.: 12/281,637

(22) PCT Filed: Mar. 15, 2007

(86) PCT No.: PCT/FR2007/050929
§ 371 (c)(1),
(2), (4) Date: Oct. 30, 2008

(87) PCT Pub. No.: WO2007/113413
PCT Pub. Date: Oct. 11, 2007

(65) Prior Publication Data
US 2009/0189411 A1    Jul. 30, 2009

(30) Foreign Application Priority Data
Apr. 3, 2006 (FR) .................................... 06 51169

(51) Int. Cl.
*B60J 1/00* (2006.01)
(52) U.S. Cl. ................ 296/146.15; 296/96.21; 296/211; 52/208

(58) Field of Classification Search .................. 296/84.1, 296/96.21, 146.3, 146.15, 203.01, 216.07, 296/216.06, 216.09; 52/204.62, 208; 428/192
See application file for complete search history.

(56) References Cited

U.S. PATENT DOCUMENTS
2006/0232093 A1   10/2006   Boehm et al.

FOREIGN PATENT DOCUMENTS
FR   2 814 706   4/2002
WO   2004 073976   9/2004

OTHER PUBLICATIONS
U.S. Appl. No. 12/667,789, filed Jan. 5, 2010, Perrin, et al.

*Primary Examiner* — Dennis Pedder
*Assistant Examiner* — Jason Daniels
(74) *Attorney, Agent, or Firm* — Oblon, Spivak, McClelland, Maier & Neustadt, L.L.P.

(57) ABSTRACT

A vehicle including a window fastened to a body wall and a method of assembling the vehicle. The window is lined with a safety film adhering to an inner face of the window. A border at the periphery of the window is free of film such that a peripheral limit of the film is situated at a distance from the edge of the window, the distance separating the edge of the window and the limit of the film being alternately variable such that first peripheral portions of the film are in contact with a strip of adhesive, which fastens the window to a vehicle body wall, and second peripheral portions of the film are free with respect to the strip of adhesive.

9 Claims, 3 Drawing Sheets

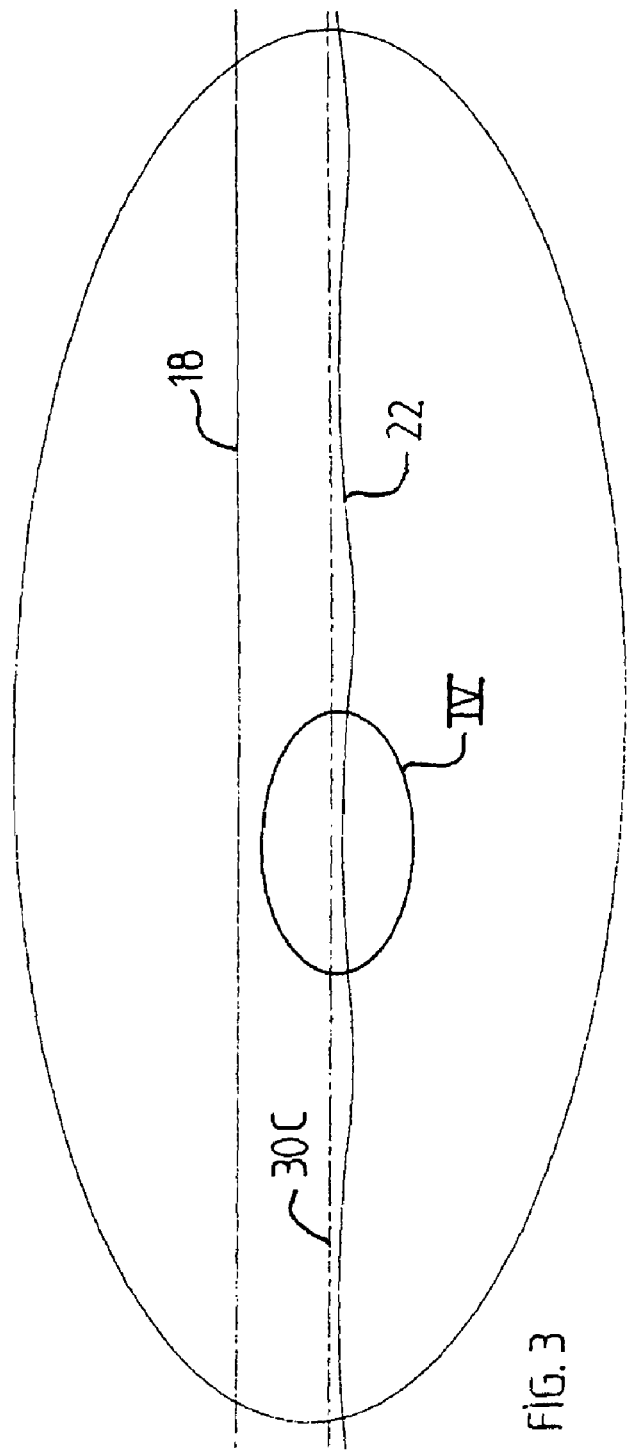
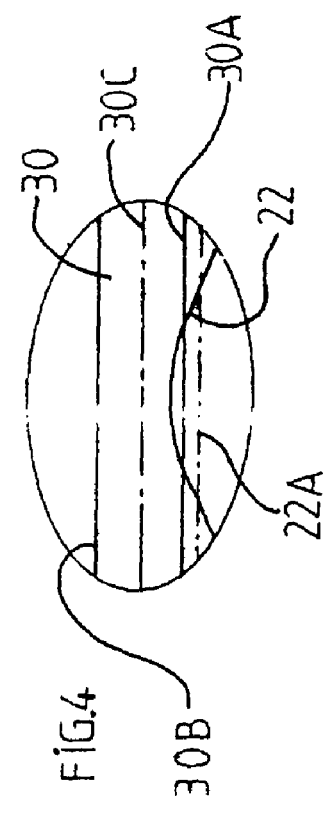
FIG. 3
FIG. 4

VEHICLE COMPRISING A WINDOW LINED WITH A SAFETY FILM, AND PRODUCTION METHOD

The present invention relates to a vehicle comprising a window lined with a safety film. It concerns in particular a vehicle in which the film is adhering to an inner face of the window.

The document FR2 814 706 describes a vehicle in which the window closes an aperture in the roof. The film is a safety film which has an anti-intrusion or anti-break function.

A problem is, for example in the case of a window which is a rear window of the vehicle, to attach the window to the body, and also to attach the periphery of the film, without the attachment of the film spoiling the quality of the attachment of the window to the body.

The document WO2004073976 suggests embedding the whole periphery of a film in an adhesive strip, to the detriment of the ease of attachment of the window to a body element and to the detriment of the ease of attachment of the periphery of the film. In addition, the document WO2004073976 shows the use of a retaining element, to the detriment of the cost.

The invention aims to improve on the known solutions.

The subject of the invention is a vehicle comprising a window attached to a body panel, the window being lined with a safety film adhering to an inner face of the window. A border at the periphery of the window is free of film so that a peripheral limit of the film is located at a distance from the edge of the window. The distance separating the edge of the window and the limit of the film varies alternately so that first peripheral portions of the film are in contact with a strip of adhesive attaching the window to a body panel of the vehicle and second peripheral portions of the film are free with respect to the strip of adhesive.

According to other advantageous features of the invention which can be taken separately or combined:
- the first and second peripheral portions of the film are alternately adjacent;
- the peripheral limit of the film is a smooth line;
- the limit of the film is undulating;
- the limit of the film is undulating in waves of which peaks correspond to the portions of the limit closest to the edge of the window, in the first portions, and of which troughs correspond to the portions of the limit farthest from the edge of the window, in the second portions, the outline of each peak being flatter than the outline of each trough;
- the distance separating the limit of the film and the edge of the window varies alternately according to a sine wave;
- the limit of the film follows a saw-tooth outline;
- the limit of the film follows a notched outline;
- the greatest width of the film covered by the strip of adhesive in the first portions can generally be 1 millimeter.

The invention also concerns a production method for a vehicle according to the invention.

The method comprises at least one film cutting step and one step of making the film adhere to the window prior to the fitting of the window to the vehicle. The method comprises, in a first phase of fitting the window to the vehicle, a step in which the strip of adhesive is bonded to the window. The method comprises, in a second phase of fitting the window to the vehicle, a step in which the window is pressed against the panel, the first peripheral portions of the film being in contact with the strip of adhesive and the second peripheral portions being free with respect to the strip of adhesive.

In an embodiment of the method, during the step in which the strip of adhesive is bonded to the window, the strip of adhesive is bonded to the first peripheral portions of the film.

Other features and advantages of the invention will emerge clearly on reading the following description of the non-limiting embodiment of the invention, with reference to the attached drawings, in which:

FIG. 3 is a detail view of FIG. 2 as indicated by the reference III in FIG. 2; and FIG. 4 is a detail view of FIG. 3 as indicated by the reference IV in FIG. 3.

Figure 1:
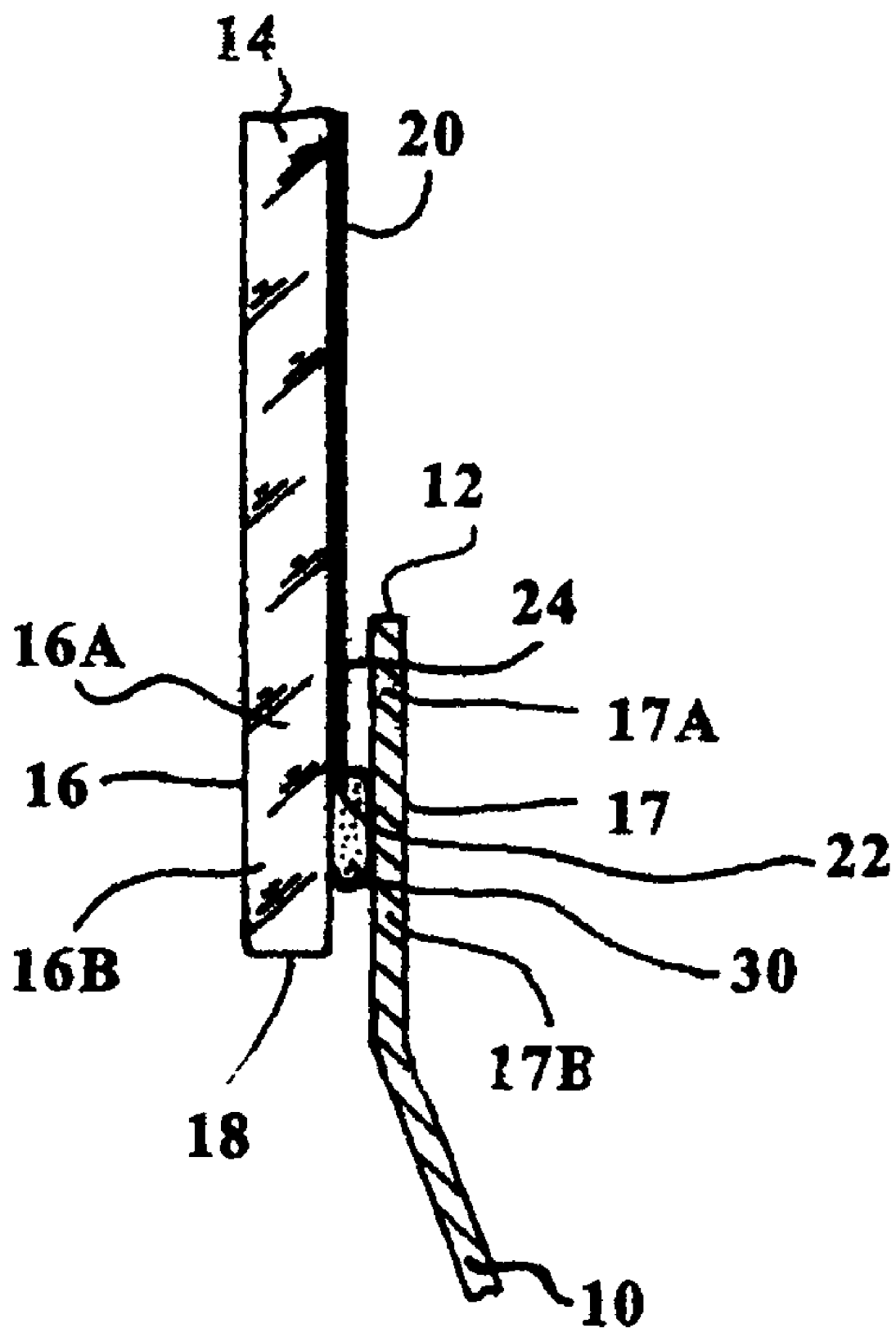
FIG. 1 is a schematic partial cross-section view of a vehicle comprising a vehicle according to the invention.

Conventionally, a motor vehicle is equipped with windows bonded to the body. This can be for example a rear window or a side quarter light.

In some cases, vehicles can be subjected to acts of vandalism such as stone-throwing. Such vehicles are equipped with a safety film added to the inner face, on the passenger compartment side, of the conventional windows. The film must, without obstructing the view, slow down illegal entry and prevent the dislocation of the window with respect to the body. If there are occupants in the vehicle, their safety is improved in particular by preventing the entry of the stone into the passenger compartment or by preventing the projection of glass fragments into the passenger compartment due to the impact of the stone.

Conventionally, such a film is a polyethylene terephthalate film with a thickness of approximately 200 to 350 microns. The film adheres to the window by means of an adhesive material.

In the embodiment of the invention described above, the bonded window is a vehicle rear window, for example fitted to a tailgate allowing access to the trunk.

The tailgate comprises a body panel 10 which defines an aperture 12 for the rear view.

The window 14 completely closes the aperture. A peripheral portion 16 of the window 14 overlaps the panel 10 all round the aperture 12. Said portion 16 of the window surrounds said aperture so as to be opposite a zone 17 of the panel lying at the periphery of the aperture.

In the example illustrated, the film 20 applied to the window is also present over the whole inner surface of the window facing the aperture, but also around this surface, in order to limit damage to the window near its edges.

In the example illustrated, a peripheral limit 22 of the film is located between the aperture 12 and the peripheral edge 18 of the window so that a peripheral band 24 of the film lies between said peripheral portion and said zone 17. The band 24 is located facing the zone 17, on an inner fraction 17A of the zone 17 adjacent to the aperture. The band 24 lies on an area of the window covering an inner fraction 16A of the peripheral portion 16 adjacent to the surface of the window facing the aperture. The inner fractions 16A and 17A lie between the level of the limit 22 and the level of the aperture 12.

An outer fraction 16B of the peripheral portion 16 is adjacent to the peripheral edge 18 of the window. The outer fraction 16B forms a border free of film, that is to say a border 16B of the window not covered by the film. With the exception of the border 16B located between the peripheral edge of the window and the peripheral limit of the film, the window is covered by the film over its whole inner surface.

The outer fraction 16B, or border 16B, and the outer fraction 17B therefore lie between the level of the edge 18 and the level of the limit 22.

A strip of adhesive 30, also called adhesive seal or adhesive bead, is located between the panel 10 and the window 16 for the attachment of the window to the body.

The strip of adhesive 30 comprises an inner edge 30A on the film side and on the side of the passenger compartment of the vehicle. The strip of adhesive 30 comprises an outer edge 30B on the side of the peripheral edge 18 of the window. The strip of adhesive 30 comprises a centerline 30C. The material of the strip of adhesive 30 is the one usually used for the bonding of windows to a motor vehicle body.

The strip of adhesive 30 is also used for the bonding of the film 20, in order to maintain the cohesion of the assembly formed by the window and the film.

According to the invention, the peripheral limit 22 of the film is not rectilinear or generally rectilinear.

Figure 2:
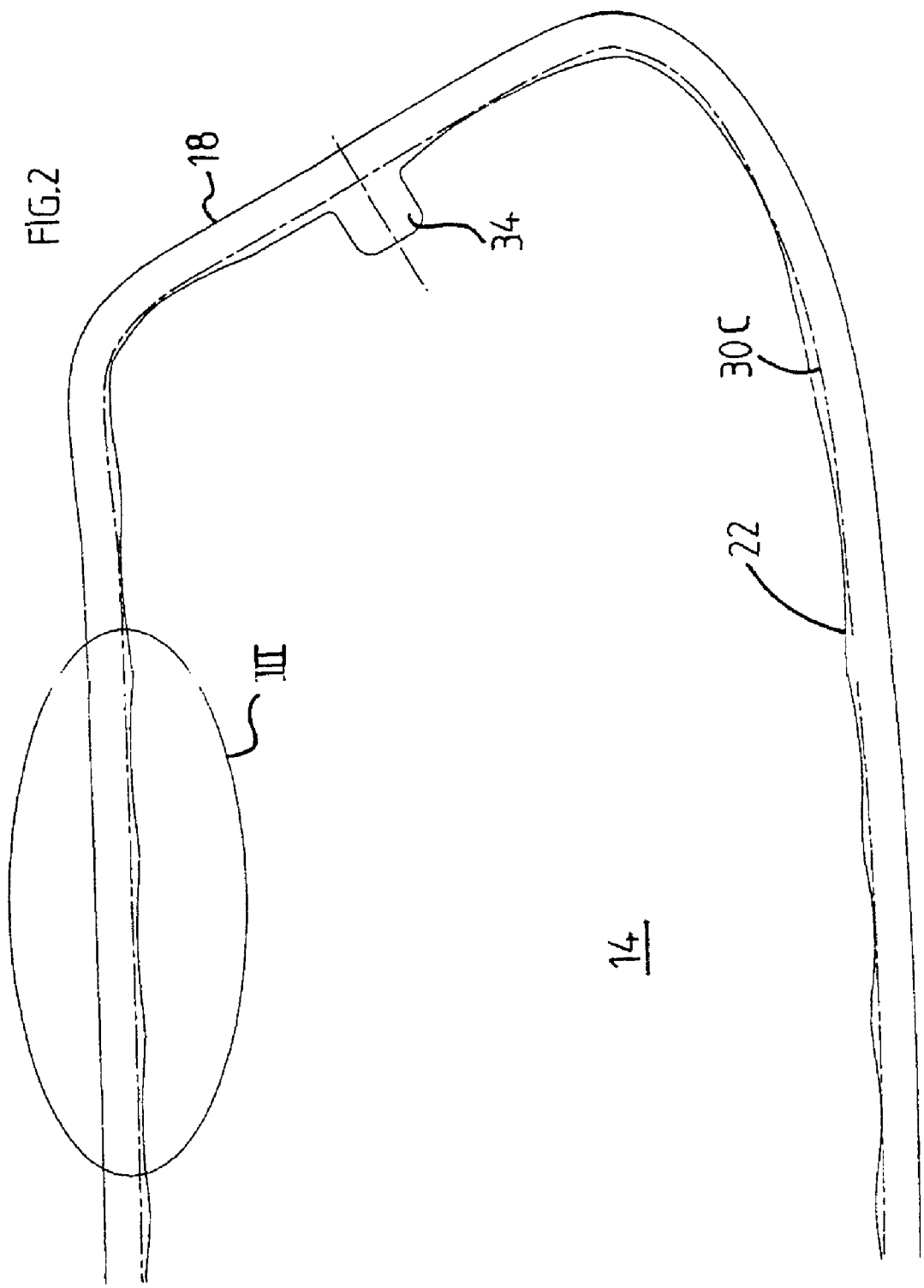
FIG. 2 is a partial plan view of a vehicle window according to the invention.

In the embodiment illustrated, the limit 22 is undulating so as to form a smooth line and comprises a median line 22A (FIG. 4) generally parallel to the edge of the window most of the way round the window, except for example near the rear window defrosting connection tabs as illustrated in portion 34 (FIG. 2). The amplitude of the undulations here is approximately 5 millimeters.

In an embodiment which is not illustrated, the limit 22 is cut generally according to a sine wave with an amplitude of 4 millimeters. The amplitude of the sine wave depends on the width of the peripheral coating of the windows, the coating usually being intended to make the adhesive non-visible from the outside.

In the embodiment illustrated, the limit 22 is cut along a wavy outline. The peak of each wave, which corresponds to the portions of the limit 22 closest to the edge of the window, has a flatter outline than the outline of the trough of each wave, which corresponds to the portions of the limit 22 farthest from the edge of the window.

According to the invention, the strip of adhesive 30 covers the wave peak and does not cover the trough of the waves. Each trough is therefore free of bonding with respect to the strip 30. In the embodiment illustrated, the strip of adhesive 30 covers the peak of the waves, generally by 1 millimeter. Here, the strip of adhesive 30 covers the peak of the waves generally by a quarter of the amplitude of the waves and by less than a quarter of the width of the strip of adhesive.

The zones of the film not covered by the strip prevent there being a zone of incipient detachment of the strip 30 with respect to the window, to the benefit of the quality of the attachment of the window 14 to the body 10.

Thus, advantageously, if the adhesive material is inadequate for the cohesion of the film and the window in an impact on the window, the strip of adhesive 30 prevents the cutting of the window by reinforcing the effect of the film at its peripheral limit, without adversely affecting the effect of the strip of adhesive for the attachment of the window to the body.

The window is supplied equipped with its film before fitting to the vehicle. At least one film cutting step, for example from a roll of film, and one step of making the film adhere to the window are therefore required prior to the fitting of the window to the vehicle.

In a first phase of fitting the window to the vehicle, the strip of adhesive 30 is bonded in an offset manner with respect to the median line 22A of the peripheral limit 22 and then the window is assembled on the body.

It should be noted that the centerline 30C of the strip of adhesive 30 is offset toward the outside, that is to say toward the peripheral edge 18 of the window 14, both with respect to the median line 22A and with respect to the peaks of the waves.

The strip 30 is applied, usually by a robot arm, both to the outer fraction 16B of the peripheral portion 16 of the window 14 and to the film 20, on the first peripheral portions of the film.

In a second fitting phase, the window is next positioned facing the aperture 12 and the zone 17 of the panel 10, then the strip 30 is pressed against the outer fraction 17B for the attachment of the window 14 to the panel 10.

The strip 30, pressed between the window and the body, usually by a robot, adheres to a portion of the peripheral limit of the film.

Usually, the strip of adhesive 30 has a width of approximately 6 to 10 millimeters.

In the embodiment illustrated, the non-rectilinear cutting of the limit of the film is continuous, that is to say with no sharp corners, but in a variant, the limit of the film follows a saw-tooth outline, that is to say with triangular cuts which form peaks and troughs. In a variant, the limit of the film follows a notched outline forming peaks and troughs.

In a variant embodiment, not all the peaks cooperate with adhesive, so that the second portions comprise a series of peaks and troughs.

Advantageously, by proceeding as above, the invention permits the bonding of the strip to windows with film directly within a main production line of the vehicle. Thus, it is possible to have a safety film in a vehicle without altering the assembly line installed in the factory for the attachment of the window to the body, and without altering the method of attachment of the window in the factory.

The invention claimed is:

1. A vehicle comprising:
  a window attached to a body panel, the window being coated with a safety film adhering to an inner face of the window,
  wherein a border at a periphery of the window is free of film so that a peripheral limit of the film is located at a distance from an edge of the window, the distance separating the edge of the window and the peripheral limit of the film varying alternately so that first peripheral portions of the film are in contact with a strip of adhesive attaching the window to a body panel of the vehicle and second peripheral portions of the film are free with respect to the strip of adhesive.

2. The vehicle as claimed in claim 1, wherein the first and second peripheral portions of the film are alternately adjacent.

3. The vehicle as claimed in claim 1, wherein the peripheral limit of the film is a smooth line.

4. The vehicle as claimed in claim 1, wherein the peripheral limit of the film is undulating.

5. The vehicle as claimed in claim 1, wherein the peripheral limit of the film is undulating in waves of which peaks correspond to portions of the peripheral limit closest to the edge of the window, in the first portions, and of which troughs correspond to portions of the peripheral limit farthest from the edge of the window, in the second portions, the outline of each peak being flatter than the outline of each trough.

6. The vehicle as claimed in claim 1, wherein the distance separating the peripheral limit of the film and the edge of the window varies alternately according to a sine wave.

7. The vehicle as claimed in claim 1, wherein the peripheral limit of the film follows a saw-tooth outline or a notched outline.

8. The vehicle as claimed in claim 1, wherein the greatest width of the film covered by the strip of adhesive in the first portions is approximately 1 millimeter.

9. A production method for a vehicle, comprising:
at least one film cutting operation and one operation making the film adhere to a window prior to fitting the window to the vehicle,
wherein in a first phase of fitting the window to the vehicle, the strip of adhesive is bonded to the window, and in a second phase of fitting the window to the vehicle, the window is pressed against the panel, the first peripheral portions of the film being in contact with the strip of adhesive and the second peripheral portions being free with respect to the strip of adhesive.

* * * * *